(No Model.)
D. LEACOCK.
BEER DISPENSING APPARATUS.
No. 525,955. Patented Sept. 11, 1894.
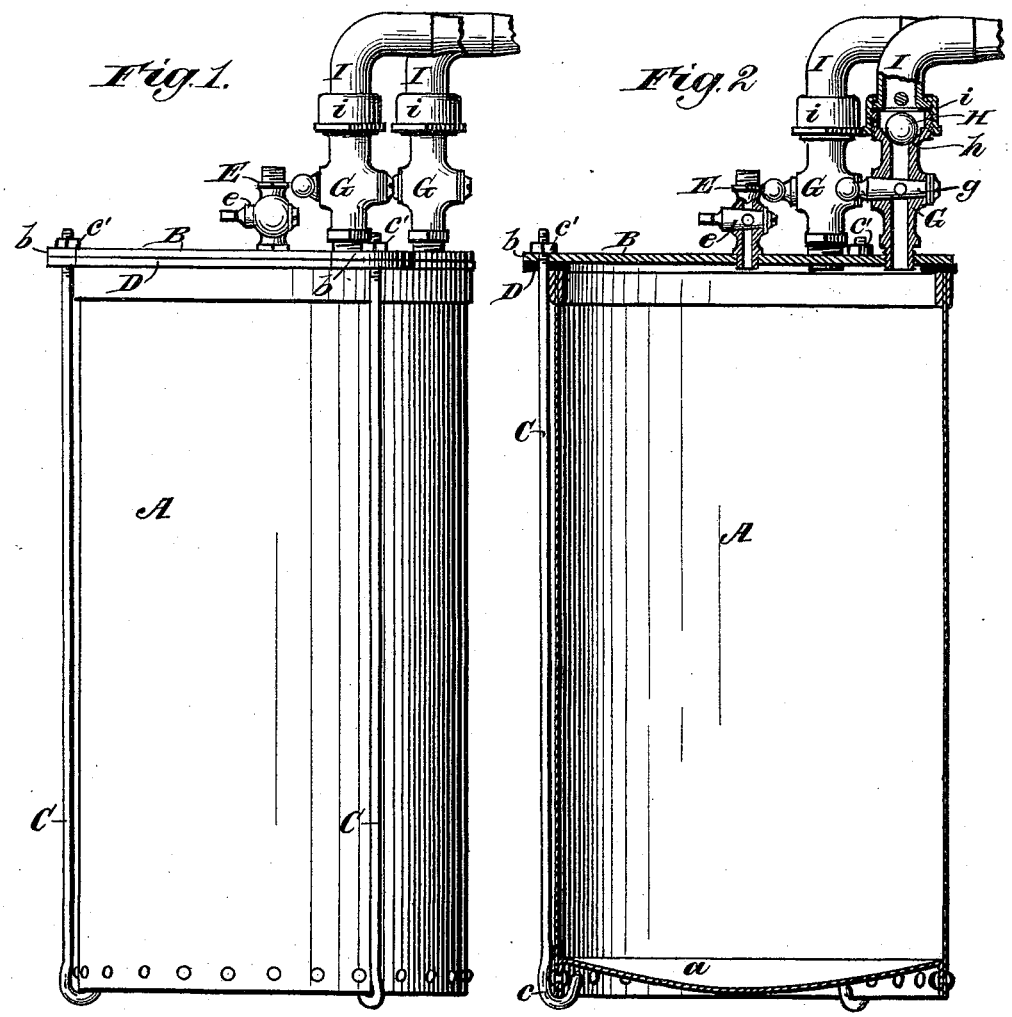
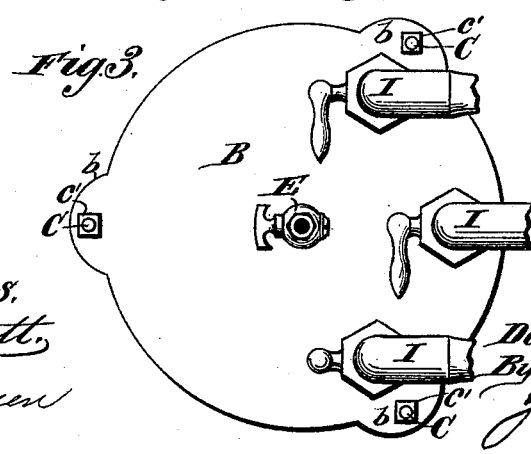
Witnesses.
Inventor.
David Leacock.
By James L. Norris.
Atty.

UNITED STATES PATENT OFFICE.

DAVID LEACOCK, OF MAHANOY CITY, PENNSYLVANIA, ASSIGNOR OF ONE-HALF TO GEORGE C. HEINZE, OF SAME PLACE.

BEER-DISPENSING APPARATUS.

SPECIFICATION forming part of Letters Patent No. 525,955, dated September 11, 1894.

Application filed February 10, 1894. Serial No. 499,799. (No model.)

*To all whom it may concern:*

Be it known that I, DAVID LEACOCK, a citizen of the United States, residing at Mahanoy City, in the county of Schuylkill and State of Pennsylvania, have invented new and useful Improvements in Beer-Dispensing Apparatus, of which the following is a specification.

This invention relates to that class of beer dispensing apparatus wherein is employed an air reservoir in which air is stored under pressure, and having connections leading to the barrels or kegs containing the beer, whereby the beer is forced from the barrels or kegs to the dispensing faucet.

The object of the present invention is to provide a simple, inexpensive and effective device of this nature that shall be capable of being thoroughly cleansed from time to time without disarranging the connections; and to provide means for effectually preventing any back flow of the beer from its containing vessel, and to these ends my invention consists in the novel construction, arrangement, and combination of parts hereinafter fully described and finally definitely pointed out in the claim following the description, due reference being had to the accompanying drawings forming a part of this specification, wherein—

Figure 1 is a side elevation of my improved device. Fig. 2 is a vertical section taken on the line 2—2, Fig. 3; and Fig. 3 is a top plan view.

A serious defect exists in devices of this nature that are in common use, owing to the fouling of the reservoir wherein the air is stored under pressure, no convenient means being provided for cleansing said vessel. The air that is forced into the reservoir and which from thence is supplied to the barrels or kegs containing the beer thus becomes foul and tainted and contaminates the beer, rendering it unwholesome and injuring its flavor. By my improved device access may very quickly and easily be had to the air reservoir and the same removed and cleansed without disturbing or disarranging any of the connections, as will hereinafter be made apparent.

Another serious objection to the beer forcing devices of this nature now in general use results from the back flow of the beer from the barrels or kegs when it is "wild" or heavily charged with gas, and to avoid this I combine with the hand operated cock that controls the communication between the air reservoir and the beer barrel or keg an automatic check-valve that will at all times permit the unobstructed passage of the air from the reservoir to the beer barrel or keg, but which will automatically close and shut off communication with the reservoir should the beer seek to flow back into the latter.

Referring to the drawings the letter A indicates the air reservoir consisting of a metallic cylinder provided with a permanently fixed bottom $a$, and a removable head or cover B provided with projecting lugs or ears $b$ perforated for the passage of rods C which at their lower ends are provided with hooks $c$ which engage or hook over the bottom edge or rim of the reservoir and at their upper ends are screw-threaded and provided with nuts $c'$ by means of which the cover B is tightly clamped to the reservoir. In order to render the joint between the reservoir and the cover perfectly air tight, I prefer to interpose between said reservoir and cover a gasket D of rubber, leather, or similar material. The preferred practice is to place the reservoir in the cellar in proximity to the place where the barrels or kegs are stored. A coupling E is tapped through the cover B and communicates with the reservoir A, and is adapted to be connected with a pipe that passes up through the floor, and at its upper end is connected with an air forcing device of any desired form, such, for example, as an air pump. A valve $e$ is arranged in the coupling E and serves to control the communication between the air reservoir and the air forcing device. Valve casings G, G are also tapped through the cover B, and communicate with the reservoir, each of said valve casings being provided with a cock or valve $g$ by means of which communication with the reservoir may be cut off, and with a check valve H, for the purpose hereinafter described. The upper end of each of said valve casings is provided with a semispherical valve-seat $h$ on which is seated a ball-valve H. The upper end of each of the valve casings G is screw-threaded, and over said screw-threaded end is fitted a collar $i$ through which passes the shouldered end of a nipple I, and by means of which said nipple is tightly clamped to the valve casing. The nipple I is designed to have secured to one end thereof a tube or pipe, the other end of which is inserted in the bung of the beer barrel or keg. A pipe is also tapped into the barrel or keg at its discharge vent and leads up through the floor to the bar where it is connected to the dispensing faucet.

In practice, the valve casings G will equal in number the kegs or barrels it is designed to keep on tap at one time, the connection between the reservoir A and the barrel or kegs being thus entirely separate and distinct. This is important, for in those devices wherein is employed a single pipe leading from the reservoir and communicating by branch pipes with the barrel or kegs, the odor or gas of one barrel or keg is apt to be communicated to the others, a most undesirable result where different brews of beer, or where both beer and ale are kept on tap. By my arrangement this is rendered impossible, the valves H, which are in effect check-valves, preventing any escape of such gas or odors from the barrels or kegs to the reservoir.

From the foregoing the operation of my improved apparatus will be readily understood. Air under pressure is forced into the reservoir A, and from thence passes by means of the pipes or tubes to the barrels or kegs. Upon opening the dispensing faucet connected with either of the discharge pipes the beer will be forced by the air up through said pipe and through the faucet. When the beer in any of the kegs is "wild," or heavily charged with gas, the beer will seek to pass through the pipes or tubes into the reservoir A, and this is effectually prevented by the check valves H. By making said valves in the form of ball-valves, as before described, there is less liability of their sticking than the ordinary stemmed puppet valves. When a barrel or keg is to be connected with the reservoir, the valve g controlling the pipe to which the barrel or keg is to be connected is first closed and the pipe is then connected with the barrel or keg at the bung and the valve g opened. The dispensing pipe is then tapped into the barrel or keg when its contents may be drawn from the dispensing faucet. By means of the valves g any one of the barrels or kegs may be disconnected from the system, it being only necessary to close the valve g that controls the communication with the particular barrel or keg that it is desired to disconnect.

In order to clean the reservoir, the nuts c' are loosened or removed from the rods C and the hooked ends c of said rods are disengaged from the lower rim of the reservoir, thus detaching it from its cover B. The reservoir may be now removed and thoroughly cleansed out inside with hot water and soda, and can be very quickly replaced by again hooking the rods C under the bottom rim and tightening up the nuts c'. By securing all the couplings and connections to the cover B of the reservoir, they are not disturbed when the reservoir is detached for cleaning, and it permits of the reservoir being removed from the cellar for the purpose.

Having described my invention, what I claim is—

In a beer dispensing apparatus, the combination of the air reservoir, the removable cover therefor, hooked rods C hooked over the bottom rim of the reservoir and passing through perforated ears b of the cover, nuts c' tapped upon the ends of said rods, valve casings G G tapped through the cover and each provided with a turning plug g and a ball check valve H seated in the upper end of the casing and confined therein by a nipple I, and nipples I detachably secured to said valve casings, substantially as shown and described.

In testimony whereof I have hereunto set my hand and affixed my seal in presence of two subscribing witnesses.

DAVID LEACOCK. [L. S.]

Witnesses:
ALBERT H. NORRIS,
VINTON COOMBS.